United States Patent Office 3,275,625
Patented Sept. 27, 1966

3,275,625
DERIVATIVES OF 7-SULFAMYL-3,4-DIHYDRO-1,2,4 - BENZOTHIADIAZINE-1,1-DIOXIDE AND PROCESS FOR THEIR PREPARATION
Erich Müller and Klaus Hasspacher, Biberach an der Riss, Germany, assignors, by mesne assignments, to Boehringer Ingelheim G.m.b.H., Ingelheim (Rhine), Germany, a corporation of Germany
No Drawing. Filed Jan. 23, 1961, Ser. No. 83,951
4 Claims. (Cl. 260—243)

This invention relates to novel derivatives of 7-sulfamyl-3,4-dihydro-1,2,4-benzothiadiazine-1,1-dioxide which are substituted in the 3-position by an alicyclic bicylic radical, as well as to processes for their preparation.

More particularly, the present invention relates to compounds having the structural formula

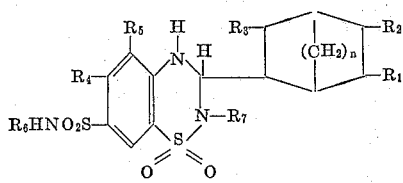

(I)

wherein $R_1$ and $R_2$ are hydrogen, halogen or, together, form a double bond,
$R_3$ is hydrogen or lower alkyl,
$R_4$ is halogen, trifluoromethyl or lower alkyl,
$R_5$ is hydrogen, halogen or lower alkyl,
$R_6$ and $R_7$ are hydrogen or lower alkyl, and
$n$ is 1 or 2.

The compounds having the structural Formula I above may be prepared by any one of the following processes:

METHOD 1

Reaction of a 4-aminobenzene-1,3-disulfonamide of the formula

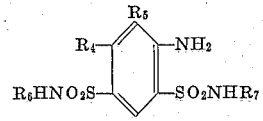

(II)

wherein $R_4$ to $R_7$ have the above-indicated meanings, with an alicyclic bicylic aldehyde of the formula

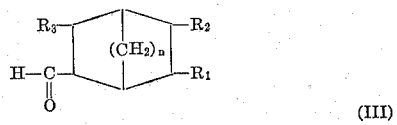

(III)

wherein $R_1$ to $R_3$ and $n$ have the above-indicated meanings, or with a reactive derivative of this aldehyde, such as its trimer, an acetal, a sodium bisulfite compound, an α,α-dihalo-compound, and the like.

The reaction is carried out at elevated temperatures, preferably at temperatures between 60 and 120° C., and advantageously in a suitable solvent, such as glacial acetic acid, dioxane, an aliphatic alcohol, a glycol ether, and the like.

The reaction may be substantially accelerated by the addition of catalytic amounts of an acid condensation agent, such as sulfuric acid, hydrochloric acid or p-toluene-sulfonic acid. Equimolar amounts of the starting materials or a small excess of the alicyclic bicylic aldehyde are used.

In the event that compounds are formed in which $R_1$ and $R_2$ together form a double bond, they may, if desired, be catalytically hydrogenated into the corresponding saturated compounds, or they may be transformed into the corresponding dihalo-compounds by addition of a halogen, in accordance with known methods.

METHOD 2

Compounds of the general Formula I, wherein $R_1$ to $R_7$ and $n$ have the previously mentioned meanings, but $R_1$ and $R_2$ together do not represent a double bond, may also be obtained by hydrogenation of 7-sulfamyl-1,2,4-benzothiadiazine-1,1-dioxide of the formula

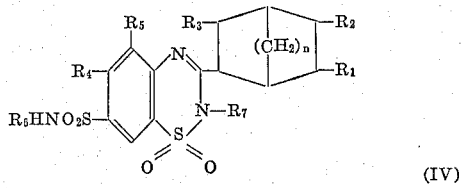

(IV)

wherein $R_1$ to $R_7$ and $n$ have the previously mentioned meanings.

The hydrogenation of the double bond in the $\Delta^3$-position is effected in known manner, most advantageously with hydrogen in the presence of a hydrogenation catalyst, or by means of complex metal hydrides, such as lithium-aluminum-hydride or sodium-borohydride. The hydrogenation is advantageously effected in the presence of a suitable solvent; for example, for the catalytic hydrogenation methanol or ethanol can be used, and for the hydrogenation with complex metal hydrides ether or tetrahydrofuran may be used.

The 4-aminobenzene-1,3-sulfonamides of the Formula II, used as starting materials, are described in the literature.

The alicyclic bicylic aldehydes of the Formula III may be prepared by processes analogous to those described in the literature; for example, by diene-synthesis from an unsaturated aldehyde and a correspondingly substituted derivative of cyclopentadiene.

The preparation of the 7-sulfamyl-1,2,4-benzothiadiazine-1,1-dioxides of the Formula IV is also effected by known methods, such as by reaction of a 4-aminobenzene-1,3-disulfonamide of the above-indicated Formula II with an alicyclic bicylic carboxylic acid of the formula

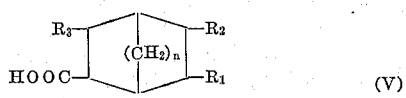

(V)

wherein $R_1$ to $R_3$ and $n$ have the above indicated meanings (obtainable by diene-synthesis from a correspondingly substituted acrylic acid and a correspondingly substituted cyclopentadiene).

The reaction is best effected at temperatures between 100 and 150° C. in the presence of an inert solvent and in the presence of an acid condensation agent, such as concentrated sulfuric acid, zinc chloride, and the like.

The following examples will further illustrate the present invention and enable others skilled in the art to understand it more completely. It is understood, however, that these examples are given for purposes of illustration only and that the invention is by no means limited to the particular embodiments recited therein.

*Example 1.* — *3-(bicyclo - [2,2,1] - hept-2'-ene-6'-yl)-6-chloro-7-sulfamyl-3,4-dihydro-1,2,4 - benzothiadiazine-1,1-dioxide*

A mixture of 8.5 gm. (0.03 mol) of 6-chloro-4-aminobenzene-1,3,-disulfonamide, 4.0 gm. (0.033 mol) of 2,5-endomethylene-$\Delta^3$-tetrahydrobenzaldehyde and 25 cc. of diethyleneglycol-dimethylether was heated for 2 hours at 100° C. During this time the major portion of the initially undissolved crystals went into solution; thereafter, the reaction mixture was allowed to stand for 14 hours at room temperature, during which the remaining undissolved crystals also went into solution. The reddish, clear solution thus obtained was admixed with 50 cc. of chloroform. The greyish-white precipitate formed thereby was separated by vacuum filtration, washed with a small amount of chloroform, dried and recrystallized from aqueous methanol. 7.5 gm. of white crystalline needles having a melting point of 229 to 230° C. were obtained. The product was identified to be the compound having the structural formula

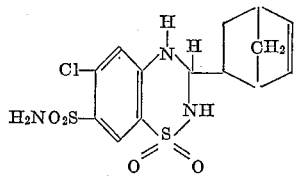

*Example II.*—*3-(bicyclo-[2,2,1]-hept-6'-yl)-6-chloro-7-sulfamyl-3,4-dihydro-1,2,4-benzothiadiazine-1,1-dioxide*

6.0 gm. of 3 - (bicyclo - [2,2,1] - hept-2'-ene-6'-yl)-6-chloro-7-sulfamyl-3,4-dihydro - 1,2,4 - benzothiadiazine-1,1-didoxide, prepared according to Example I, were dissolved in 50 cc. dioxane and subjected to catalytic reduction with hydrogen by passing hydrogen through the solution in the presence of 0.5 gm. Raney nickel at atmospheric pressure. After the calculated amount of hydrogen had been absorbed, the catalyst was filtered off and the filtrate was evaporated to dryness. The residue was dissolved in 250 cc. of hot isopropanol, the hot solution was filtered with charcoal, the filtrate was again heated until it began to boil, and then hot water was added until it began to turn cloudy. Upon allowing the aqueous mixture to cool, white scales precipitated out which were separated by vacuum filtration and dried. The dry product had a melting point of 263 to 266° C. and was identified to be the compound having the structural formula

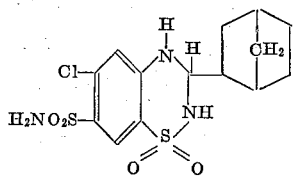

In acetic acid suspension the compound no longer discolored a small amount of bromine added thereto.

*Example III.* — *3-(2',3'-dibromo-bicyclo - [2,2,1] - hept-6'-yl) - 6 - chloro-7-sulfamyl - 3,4 - dihydro-1,2,4-benzothiadiazine-1,1-dioxide*

4.0 gm. of 3-bicyclo-[2,2,1]-hept-6'-yl)-6-chloro-7-sulfamyl-3,4-dihydro-1,2,4 - benzothiadiazine-1,1-dioxide, prepared according to Example II, were suspended in 40 cc. of glacial acetic acid. A solution of 1.6 gm. of bromine in 10 cc. of glacial acetic acid was slowly added dropwise to the suspension, accompanied by stirring; each drop of the bromine solution was rapidly discolored upon entering the suspension. After all of the bromine solution had been added and the reaction had gone to completion, the small amount of material which had not gone into solution was filtered off, and the filtrate was poured into 50 cc. of water. The white crystalline precipitate formed thereby was separated by filtration, was washed with water and dried in a dessicator over calcium chloride. 3.0 gm. of a product having a melting point of 199 to 201° C. (decomposition) were obtained; it was identified to be the compound having the structural formula

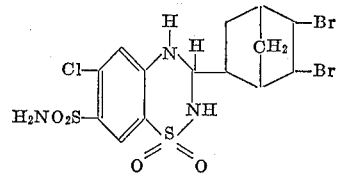

*Example IV.*—*3-(bicyclo - [2,2,1] - hept-2'-ene-6'-yl)-6-trifluoromethyl-7-sulfamyl - 3,4 - dihydro-1,2,4-benzothiadiazine-1,1-dioxide*

3.5 gm. of 4-amino - 6 - trifluoromethyl-benzene-1,3-disulfonamide, 2.6 gm. of 2,5-endomethylene-Δ³-tetrahydrobenzaldehyde and a few crystals of p-toluenesulfonic acid were dissolved in 20 cc. of dimethylformamide and the resulting solution was heated for 6 hours at 100° C. Thereafter, the reaction mixture was poured into 100 cc. of water, and the precipitate formed thereby was separated by filtration and recrystallized from a mixture of ethyl acetate and petroleum ether. 1.4 gm. of a product having a melting point of 119° C. were obtained; it was identified to be the compound having the structural formula

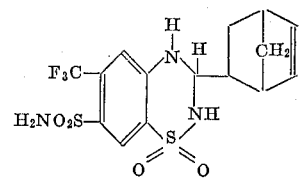

*Example V.*—*3-(bicyclo-[2,2,1]-hept-2' - ene - 6' -yl) - 5-methyl-6-chloro-7-sulfamyl-3,4-dihydro - 1,2,4 - benzothiadiazine-1,1-dioxide*

6.0 gm. (0.02 mol) of 6-chloro-5-methyl-4-aminobenzene-1,3-disulfonamide and 2.5 gm. (0.02 mol) of 2,5-endomethylene-Δ³-tetrahydrobenzaldehyde were suspended in 10 cc. of diethyleneglycol-dimethylether, and the resulting suspension was heated to 100° C. while stirring. After 1½ hours of heating all of the suspended solids had gone into solution. The resulting solution was allowed to cool and was then diluted with 40 cc. chloroform. Petroleum ether was slowly added to the solution, whereby a brown resinous mass precipitated out which was separated and dissolved in hot ethylene chloride. The resulting solution was filtered through charcoal and to the cooled filtrate gasoline was added, whereby a white, crystalline substance precipitated out. The precipitated product had a melting point of 190 to 191° C. It was identified to be the compound having the structural formula

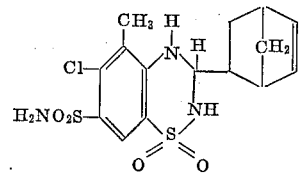

*Example VI.*—*3-(bicyclo-[2,2,1]-hept-2'-ene-6'-yl) - 5,6-dichloro-7-sulfamyl-3,4 - dihydro - 1,2,4 - benzothiadiazine-1,1-dioxide*

6.4 gm. of 5,6-dichloro-4-aminobenzene-1,3-disulfonamide, 2.7 gm. of 2,5-endomethylene-Δ³-tetrahydrobenzaldehyde and a few crystals of p-toluene-sulfonic acid were dissolved in 40 cc. dioxane, and the resulting solution was heated for 3 hours at 100° C. Thereafter, the reaction solution was allowed to cool, whereupon the reaction product crystallized out. The crystalline precipitate was separated and recrystallized from aqueous methanol, yielding 2.5 gm. of a substance having a melting point of 184° C. It was identified to be the compound having the structural formula

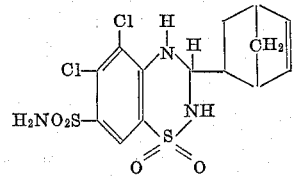

Analysis.—Calculated: C, 39.8%; H, 3.57%; N, 9.94%. Found: C, 39.75%; H, 3.76%; N, 9.70%.

*Example VII.—2-methyl-3-(bicyclo-[2,2,1]-hept-2' - ene-6'-yl)-6-chloro-7-methylsulfamyl-3,4 - dihydro - 1,2,4-benzothiadiazine-1,1-dioxide*

15 gm. of 6-chloro-4-amino-1,3-di-(methyl-sulfamyl)-benzene and 6.1 gm. of bicyclo-[2,2,1]-hept-2-ene-6-yl-aldehyde were suspended in dioxane and a spatula-tip-ful of p-toluene sulfonic acid was added. The resulting mixture was heated to the boiling point, and after 10 minutes of boiling, all of the initially undissolved solids had gone into solution. The solution was allowed to cool, and then petroleum ether was added until all of the raw reaction product had precipitated out. The precipitate was dissolved in dioxane and reprecipitated therefrom by adding water. A white crystalline substance was obtained which had a melting point of 232 to 235° C. It was identified to be the compound having the structural formula

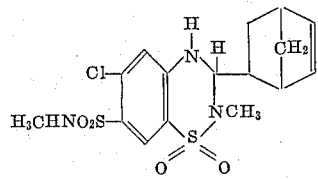

Analysis.—Calculated: C, 46.00%; H, 4.79%; N, 10.06%. Found: C, 45.90%; H, 4.97%; N, 9.82%.

*Example VIII.—3-(bicyclo-[2,2,2]-oct-2'-ene-6' - yl) - 6-chloro-7-sulfamyl-3,4-dihydro-1,2,4 - benzothiadiazine-1,1-dioxide*

1.0 gm. of bicyclo-[2,2,2]-oct-2-ene-6-yl-aldehyde obtained by diene-synthesis from acrolein and cyclohexadiene, and 2.1 gm. of 6-chloro-4-amino-1,3-disulfamyl-benzene were suspended in 10 cc. dioxane. The resulting suspension was reacted and the reaction product isolated as described in the preceding example. A white crystalline substance was obtained which had a melting point of 276 to 277° C. (decomposition). It was identified to be the compound having the structural formula

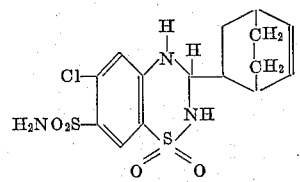

Analysis.—Calculated: C, 44.6%; H, 4.49%. Found: C, 44.8%; H, 4.60%.

*Example IX.—3-(5'-methyl-bicyclo-[2,2,1]-hept-2' - ene-6'-yl)-6-chloro-7-sulfamyl-3,4-dihydro - 1,2,4 - benzothiadiazine-1,1-dioxide*

This compound was synthesized from 6-chloro-4-amino - 1,3 - disulfamyl-benzene and 5 - methyl-bicyclo-[2,2,1]-hept-2-ene-6-yl-aldehyde (obtained by diene-synthesis from crotonaldehyde and cyclopentadiene) by a procedure analogous to that described in Example I. The product was obtained in the form of a white crystalline substance having a melting point of 197 to 199° C. It was analyzed to be the compound having the structural formula

*Example X.—3-(bicyclo-[2,2,1]-hept-2'-ene - 6' - yl) - 6-chloro-7-sulfamyl-3,4-dihydro-1,2,4 - benzothiadiazine-1,1-dioxide*

A mixture of 8.6 gm. of 6-chloro-4-amino-benzene-1,3-disulfonamide, 3.7 gm. of trimeric endomethylene-$\Delta^3$-tetrahydrobenzaldehyde (M.P. 155° C.; prepared from the monomeric aldehyde by polymerization for 6 hours at 20° C. in petroleum ether in the presence of a catalytic amount of p-toluene sulfonic acid), a few crystals of p-toluene-sulfonic acid and 25 cc. of dioxane was heated for 1 hour at 100° C. The clear solution formed thereby was allowed to cool and was stirred into 150 cc. of chloroform. The precipitate which separated out was isolated by vacuum filtration and was recrystallized from aqueous 60% methanol. 6.0 gm. of the product having the structural formula shown in Example 1 were obtained; it had a melting point of 226 to 230° C.

The compounds embraced by Formula I above are useful in that they are highly effective diuretics of the carbonic anhydrase inhibitor type (for discussion of carbonic anhydrase inhibitors see Goodman and Gilman, The Pharmacological Basis of Therapeutics, second edition, pages 853 to 855); however, their carbonic anhydrase inhibiting effect is significantly lower in comparison to Diamox (5-acetamido-1,3,4-thiadiazole - 2 - sulfonamide), which is a considerable advantage particularly with respect to the danger of a reduction in the reabsorption of sodium bicarbonate in the renal metabolic cycle. Moreover, they are superior over known diuretic compounds of similar structure in that they exhibit an extraordinarily low toxicity and increase the sodium and chloride excretion to a greater degree, whereas they increase the potassium excretion to a much lesser degree, especially at high doses, than the known diuretic heterocyclic sulfonamides. For example, 3-(bicyclo-[2,2,1]-hept-2'-ene-6'-yl) - 6 - chloro-7-sulfamyl-3,4-dihydro-1,2,4-benzothiadiazine-1,1 - dioxide is about 5 times more effective and 3-(bicyclo-[2,2,1]-hept-6'-yl)-6-chloro-7-sulfamyl-3,4 - dihydro - 1,2,4-benzothiadiazine-1,1-dioxide is 2.2 times more effective in producing an increase of the sodium and chloride excretion than the known compound 6-chloro-7-sulfamyl-3,4-dihydro-1,2,4 - benzothiadiazine - 1,1 - dioxide. Thus, in pharmacological tests on rats it was found that peroral administration of 313γ/kg. of 3-(bicyclo-[2,2,1]-hept-2'-ene-6'-yl)-6-chloro-7-sulfamyl-3,4-dihydro-1,2,4 - benzothiadiazine-1,1-dioxide increased the sodium and chloride excretion rate to about 1500μ val. per test group, whereas the potassium excretion rate did not exceed a value of 400 to 500μ val. per test group.

In vivo tests on anesthetized dogs showed that 100γ of 3-(bicyclo-[2,2,1]-hept-2'-ene-6'-yl)-6-chloro - 7 - sulfamyl-3,4-dihydro-1,2,4-benzothiadiazine-1,1-dioxide produced a greater diuretic activity than 400γ of 6-chloro-7-sulfamyl-3,4-dihydro-1,2,4-benzothiadiazine-1,1-dioxide or 4 mgm. of 6-chloro-7-sulfamyl-1,2,4-benzothiadiazine-1,1-dioxide.

Moreover, by chronic administration of 3-(bicyclo-[2,2,1]-hept-2'-ene-6'-yl)-6-chloro-7 - sulfamyl - 3,4 - dihydro-1,2,4-benzothiadiazine-1,1-dioxide to dogs suffering from serious ascites due to constriction of the vena cava inferior, the recurrence of the ascites after punncture was either completely prevented or the time interval until recurrence was considerably extended.

The toxicity of the compound was found to be extremely low. Thus, peroral administration of a dosage of 2 gm./kg. per day, that is, 40,000 times the diuretic threshold dosage, was tolerated by rats over a period of three months without appreciable side effects.

For pharmacological purposes the compounds according to the present invention may be administered either perorally, by injection or rectally, in suitable dosage unit forms, such as tablets, coated pills, suppositories, capsules, ampules and the like, the single dose being 2.5 to 25 mgm., preferably 2.5 to 10 mgm., and the daily dose rate being 5 to 50 mgm., preferably 5 to 15 mgm.

The following are illustrative examples of suitable dosage unit compositions which may be used to administer the compounds of the invention to edematous warm-blooded animals requiring diuretic therapy. The parts are parts by weight, unless otherwise specified.

*Example XI*

Tablets.—The tablet composition is compounded from the following ingredients:

| | Parts |
|---|---|
| (1) 3-(bicyclo-[2,2,1]-hept-2'-ene-6'-yl)-6 - chloro-7-sulfamyl-3,4-dihydro-1,2,4 - benzothiadiazine-1,1-dioxide | 5.0 |
| (2) Calcium phosphate, sec. | 47.0 |
| (3) Powdered lactose | 20.0 |
| (4) Dry potato starch | 30.0 |
| (5) Silicic acid | 3.0 |
| (6) Polyvinyl-pyrrolidone | 4.0 |
| (7) Tartaric acid | 1.0 |
| (8) Alginic acid | 5.0 |
| (9) Stearic acid | 0.5 |
| (10) Talcum | 4.5 |
| Total | 140.0 |

Compounding procedure.—Ingredients (1)–(6) are admixed with each other and the resulting mixture was kneaded with a 3.3% solution of tartaric acid in ethanol. The moist granulate thus obtained is forced through a 1 mm.-mesh screen, dried for 15 hours at 40° C. and again screened through the 1 mm.-mesh screen. Thereafter, the alginic acid and a mixture of the stearic acid and the talcum are added to the dry granulate, and the mixture is homogenized. The composition is then pressed into tablets, weighing 140 mgm. each, with the aid of a commercial tablet-making machine. Each tablet contains 5 mgm. of the active diuretic ingredient.

*Example XII*

Coated pills.—The tablets prepared in Example XI are provided by customary methods with a thin shell consisting essentially of sugar and talcum. The coated pills are then polished with beeswax in a rotary drum polisher. Each pill weighs 220 mgm.

*Example XIII*

Suppositories.—The suppository composition is compounded from the following ingredients:

| | Parts |
|---|---|
| 3 - (bicyclo-[2,2,1]-hept-2'-ene-6'-yl)-6-chloro-7-sulfamyl - 3,4 - dihydro-1,2,4-benzothiadiazine-1,1-dioxide | 10.0 |
| Cocoa butter | 1690.0 |
| Total | 1700.0 |

Compounding procedure.—The active ingredient is screened through a 0.15 mm.-mesh screen and is then stirred into the molten cocoa butter at 37° C. The resulting mixture is poured into cooled suppository molds holding about 1700 mgm. of the mixture. Each suppository contains 10 mgm. of the active ingredient.

*Example XIV*

Dry-content ampules.—Contents to be dissolved in isotonic solvent to prepare injectable solution.

(a) Active ingredient ampule: The contents of the ampules are compounded from the following ingredients:

| | Parts |
|---|---|
| 3 - (bicyclo - [2,2,1]-hept-2'-ene-6'-yl)-6-chloro-7-sulfamyl - 3,4 - dihydro - 1,2,4-benzothiadiazine-1,1-dioxide | 2.5 |
| Sodium chloride | 17.5 |
| Total | 20.0 |

Compounding procedure.—The active ingredient is thoroughly admixed with the sodium chloride and the mixture is screened through a 0.3 mm.-mesh screen. The screened mixture is then sterilized for 3 hours at 140° C. in hot air chamber and 20 mgm. portions are filled under sterile conditions into ampules of suitable size. The ampules are then sealed with rubber stoppers and capped with aluminum caps.

(b) Isotonic solvent ampules: The solvent is compounded from the following ingredients:

Sodium hydroxide, 0.77 part
Double distilled water, q.s. ad., 2 parts by vol.

Compounding procedure.—The sodium hydroxide is dissolved in a sufficient amount of distilled water and the solution is diluted with distilled water to bring it to the desired volume. The solution is filtered until free from fibrous material and is filled into clear ampules holding 2 ml. each. The ampules are sterilized for 20 minutes at 120° C. and sealed.

The contents of one active ingredient ampule are dissolved in the contents of one isotonic solvent ampule to prepare an injectable solution containing 2.5 mgm. of active ingredient.

*Example XV*

Liquid-content ampules.—The contents of the ampules are compounded from the following ingredients:

| | Parts |
|---|---|
| 3 - (bicyclo - [2,2,1]-hept-2'-ene-6'-yl)-6-chloro-7-sulfamyl - 3,4 - dihydro - 1,2,4-benzothiadiazine-1,1-dioxide | 2.5 |
| Aluminum stearate | 20.0 |
| Peanut oil, q.s. ad. 2 parts by vol. | |

Compounding procedure.—The peanut oil is heat-sterilized for 2 hours at 130° C. and is then allowed to cool to 60° C. At this temperature the aluminum stearate and the active ingredients (heat-sterilized; particle size maximum 5μ) are stirred into the peanut oil. The resulting suspension is cooled to room temperature, homogenized and filled into 2 ml. sterile white ampules. Each ampule contains 2.5 mgm. of active ingredient.

*Example XVI*

Gelatin capsules.—The contents of the capsules are compounded from the following ingredients:

| | Parts |
|---|---|
| 3 - (bicyclo - [2,2,1]-hept-2'-ene-6'-yl)-6-chloro-7-sulfamyl - 3,4 - dihydro - 1,2,4-benzothiadiazine-1,1-dioxide | 5.0 |
| Lactose | 195.0 |
| Total | 200.0 |

Compounding procedure.—The active ingredient is thoroughly admixed with the lactose and the mixture is screened through a 0.3 mm.-mesh screen. The screened mixture is then filled in 200 mgm. portions into No. 3 gelatin capsules.

The diuretic compounds of the present invention may also be administered in combination with other therapeutic agents. The following examples illustrate dosage unit compositions containing not only a diuretic according to the invention but also other therapeutically active components in addition to the usual inert materials.

Example XVII

*Tablets.*—The tablets are compounded from the following ingredients:

| | Parts |
|---|---|
| 3-(bicyclo-[2,2,1]-hept-2'-ene-6'-yl)-6 - chloro - 7-sulfamyl-3,4 - dihydro - 1,2,4 - benzothiadiazine-1,1-dioxide | 5.0 |
| Reserpine | 0.1 |
| Potassium chloride | 200.0 |
| Lactose | 100.0 |
| Potato starch | 74.9 |
| Stearic acid | 2.0 |
| Talcum | 18.0 |
| Total | 400.0 |

*Compounding procedure.*—The benzothiadiazine compound and the reserpine, are thoroughly admixed with each other, and the stearic acid is mixed with the talcum. The two mixtures are then combined and blended with the remaining ingredients. The resulting mixture is pressed into tablets weighing 400 mgm. each with the aid of a commercial tablet-making machine. Each tablet contains 5 mgm. of the duretic and 0.1 mgm. of reserpine.

Example XVIII

*Coated pills.*—The pill cores are compounded from the following ingredients:

| | Parts |
|---|---|
| (1) 3-(bicyclo-[2,2,1]-hept-2'-ene-6'-yl)-6 - chloro-7-sulfamyl-3,4 - dihydro - 1,2,4 - benzothiadiazine-1,1-dioxide | 4.0 |
| (2) Rescinnamine | 0.3 |
| (3) Calcium phosphate (sec.) | 47.7 |
| (4) Lactose | 20.0 |
| (5) Potato starch | 50.0 |
| (6) Silicic acid | 3.0 |
| (7) Polyvinyl-pyrrolidone | 4.0 |
| (8) Tartaric acid | 1.0 |
| (9) Alginic acid | 5.0 |
| (10) Stearic acid | 0.5 |
| (11) Talcum | 4.5 |
| Total | 140.0 |

*Compounding procedure.*—Ingredients (1)–(7) are admixed with each other, the rescinnamine being previously thoroughly mixed with the benzothiadiazine compound. The resulting mixture is kneaded with a 3.3% solution of the tartaric acid in ethanol. The moist granulate obtained thereby is forced through a 1 mm.-mesh screen and dried for 15 hours at 40° C. The dry granulate is again screened through a 1 mm.-mesh screen. Then the alginic acid and a mixture of the stearic acid and the talcum are added. The entire mixture is pressed into tablets weighing 140 mgm. each. The tablets thus obtained are provided by customary methods with a thin coating consisting essentially of sugar and talcum, and are then polished with beeswax. Each pill weighs about 220 mgm. and contains 4 mgm. of the diuretic and 0.3 mgm. of rescinnamine.

Example XIX

*Gelatin capsules.*—The contents of the capsules are compounded from the following ingredients:

| | Parts |
|---|---|
| 3-(bicyclo-[2,2,1]-hept-2'-ene-6'-yl)-6 - chloro - 7-sulfamyl - 3,4 - dihydro - 1,2,4 - benzothiadiazine-1,1-dioxide | 3.0 |
| Serpentine (alkaloid) | 1.0 |
| Reserpine | 0.2 |
| Lactose | 195.8 |
| Total | 200.0 |

*Compounding procedure.*—The benzothiadiazine compound, the reserpine and the serpentine are admixed thoroughly with the lactose. The resulting mixture is forced through a 0.3 mm.-mesh screen, and 200 mgm. portions thereof are filled into No. 3 gelatin capsules. Each capsule contains 3 mgm. of the diuretic, 1 mgm. of serpentine and 0.2 mgm. of reserpine.

Example XX

*Tablets.*—The tablets are compounded from the following ingredients:

| | Parts |
|---|---|
| 3-(bicyclo-[2,2,1]-hept-2'-ene-6'-yl)-6 - chloro - 7-sulfamyl-3,4-dihydro-1,2,4-benzothiadiazine | 5.0 |
| Trimethidinium methosulfate (Camphidonium) | 10.0 |
| Silicic acid | 2.0 |
| Potato starch | 18.5 |
| Lactose | 73.0 |
| Soluble starch | 4.5 |
| Stearic acid | 2.5 |
| Talcum | 4.5 |
| Total | 120.0 |

*Compounding procedure for 1000 tablets.*—The benzothiadiazine compound and the Camphidonium are thoroughly admixed with each other and the resulting mixture is combined with 10 mg. of potato starch and 55 gm. lactose. The mixture is then granulated with the aid of a 30% solution of the soluble starch in water and a 40% solution of 1.0 gm. of stearic acid in ethanol. The moist granulate is forced through a 1.0 mm.-mesh screen, dried at 40° C., combined with a milled mixture of the remaining stearic acid and the talcum, and the other ingredients are added. The entire mixture is homogenized and pressed into tablets weighing 120 mgm. each. Every tablet contains 5 mgm. of the diuretic and 10 mgm. of Camphidonium.

While we have illustrated the present invention with the aid of certain specific embodiments thereof, it will be readily apparent to those skilled in the art that the invention is not limited to those embodiments and that various changes and modifications may be made without departing from the spirit of the invention or the scope of the appended claims.

We claim:

1. A compound of a structural formula selected from the group consisting of

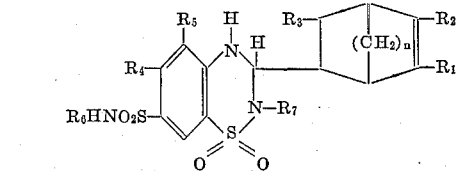

and

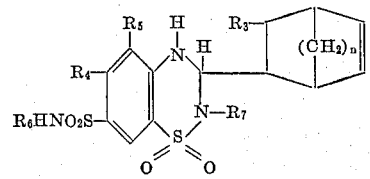

wherein $R_1$ and $R_2$ are selected from the group consisting of hydrogen and bromine, $R_3$ is selected from the group consisting of hydrogen and methyl, $R_4$ is selected from the group consisting of chlorine and trifluoromethyl, $R_5$ is selected from the group consisting of hydrogen, methyl and chlorine, $R_6$ and $R_7$ are selected from the group consisting of hydrogen and methyl, and $n$ is an integer from 1 to 2, inclusive.

2. 3-(bicyclo-[2,2,1]-hept-2′-ene-6′-yl) - 6 - chloro - 7-sulfamyl-3,4-dihydro-1,2,4-benzothiadiazine-1,1-dioxide.

3. 3-(bicyclo-[2,2,1]-hept-6′-yl)-6-chloro-7 - sulfamyl-3,4-dihydro-1,2,4-benzothiadiazine-1,1-dioxide.

4. 3-(5′-methyl-bicyclo-[2,2,1]-hept-2′-ene-6′ - yl) - 6-chloro-7-sulfamyl-3,4 - dihydro - 1,2,4 - benzothiadiazine-1,1-dioxide.

References Cited by the Examiner

UNITED STATES PATENTS 2,910,473 10/1959 Novello _____ 260—243
3,052,695 9/1962 Close.

FOREIGN PATENTS 55,495/59 12/1959 Australia.

OTHER REFERENCES

Close et al.: J. Amer. Chem. Soc., vol. 82, pp. 1132–1135 (1960).

NICHOLAS S. RIZZO, *Primary Examiner.*

IRVING MARCUS, *Acting Examiner.*